(12) United States Patent
Lewkoski

(10) Patent No.: US 9,624,955 B2
(45) Date of Patent: Apr. 18, 2017

(54) SUB-SEA MULTIPLE QUICK CONNECTOR ASSEMBLY

(71) Applicant: Illinois Tool Works Inc., Glenview, IL (US)

(72) Inventor: Randolph Dale Lewkoski, Shiner, TX (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 959 days.

(21) Appl. No.: 13/907,148

(22) Filed: May 31, 2013

(65) Prior Publication Data

US 2014/0112699 A1    Apr. 24, 2014

Related U.S. Application Data

(60) Provisional application No. 61/717,493, filed on Oct. 23, 2012.

(51) Int. Cl.
*F16B 17/00* (2006.01)
*E21B 33/038* (2006.01)
(Continued)

(52) U.S. Cl.
CPC .......... *F16B 17/00* (2013.01); *E21B 33/0385* (2013.01); *F16L 1/26* (2013.01);
(Continued)

(58) Field of Classification Search
CPC ....... B62D 33/02; B62D 33/0207; F16B 9/02; F16B 9/026; E21B 17/02; E21B 33/038; H01R 13/62; H01R 13/523; H01R 13/52
See application file for complete search history.

(56) References Cited

U.S. PATENT DOCUMENTS 7,172,447 B2 * 2/2007 Allensworth ............. F16L 1/10
                                                          439/271
8,499,839 B2 * 8/2013 Reid ....................... E21B 41/04
                                                          166/338
(Continued)

FOREIGN PATENT DOCUMENTS

EP    1106898    6/2001
EP    2211015    7/2010
(Continued)

OTHER PUBLICATIONS

International Search Report from PCT application No. PCT/US2013/065177, dated Nov. 14, 2014, 12 pgs.

*Primary Examiner* — Victor MacArthur
(74) *Attorney, Agent, or Firm* — Fletcher Yoder P.C.

(57) ABSTRACT

A multiple quick connector (MQC) assembly is described herein. The MQC assembly includes a male sub-assembly that includes a plurality of quick connectors coupled to a first circular plate, and an actuator coupled to the first circular plate. The actuator is configured to actuate a shaft having a draw nut attached to an axial end of the shaft. The MQC assembly also includes a female sub-assembly that includes a plurality of couplers coupled to a second circular plate. Each of the couplers is configured to couple to a respective quick connector of the male sub-assembly. The second circular plate comprises an aperture disposed therethrough. Actuation of the shaft causes the draw nut to extend axially through the aperture, and to rotate with respect to the aperture to lock the male sub-assembly axially with respect to the female sub-assembly.

18 Claims, 8 Drawing Sheets

(51) Int. Cl.
  *F16L 37/56* (2006.01)
  *F16L 39/04* (2006.01)
  *F16L 1/26* (2006.01)

(52) U.S. Cl.
  CPC ............... *F16L 37/56* (2013.01); *F16L 39/04* (2013.01); *Y10T 29/49895* (2015.01); *Y10T 403/24* (2015.01)

(56) References Cited

U.S. PATENT DOCUMENTS

| | | | |
|---|---|---|---|
| 9,315,248 B2* | 4/2016 | Williams | B63G 8/001 |
| 2004/0127084 A1* | 7/2004 | Glennie | F16L 37/252 |
| | | | 439/316 |
| 2006/0079107 A1* | 4/2006 | Allensworth | F16L 1/10 |
| | | | 439/271 |
| 2007/0253780 A1* | 11/2007 | Pihl | E02F 5/04 |
| | | | 405/184 |
| 2010/0186964 A1* | 7/2010 | Reid | E21B 41/04 |
| | | | 166/341 |
| 2012/0266803 A1* | 10/2012 | Zediker | B63G 8/001 |
| | | | 114/337 |
| 2013/0220161 A1* | 8/2013 | Coppedge | C06D 5/00 |
| | | | 102/531 |
| 2014/0112699 A1* | 4/2014 | Lewkoski | F16B 17/00 |
| | | | 403/33 |
| 2014/0246232 A1* | 9/2014 | Wyatt | H02G 1/10 |
| | | | 174/75 D |

FOREIGN PATENT DOCUMENTS

| | | |
|---|---|---|
| EP | 2299051 | 3/2011 |
| GB | 2361274 | 10/2001 |
| GB | 2408299 | 5/2005 |

* cited by examiner

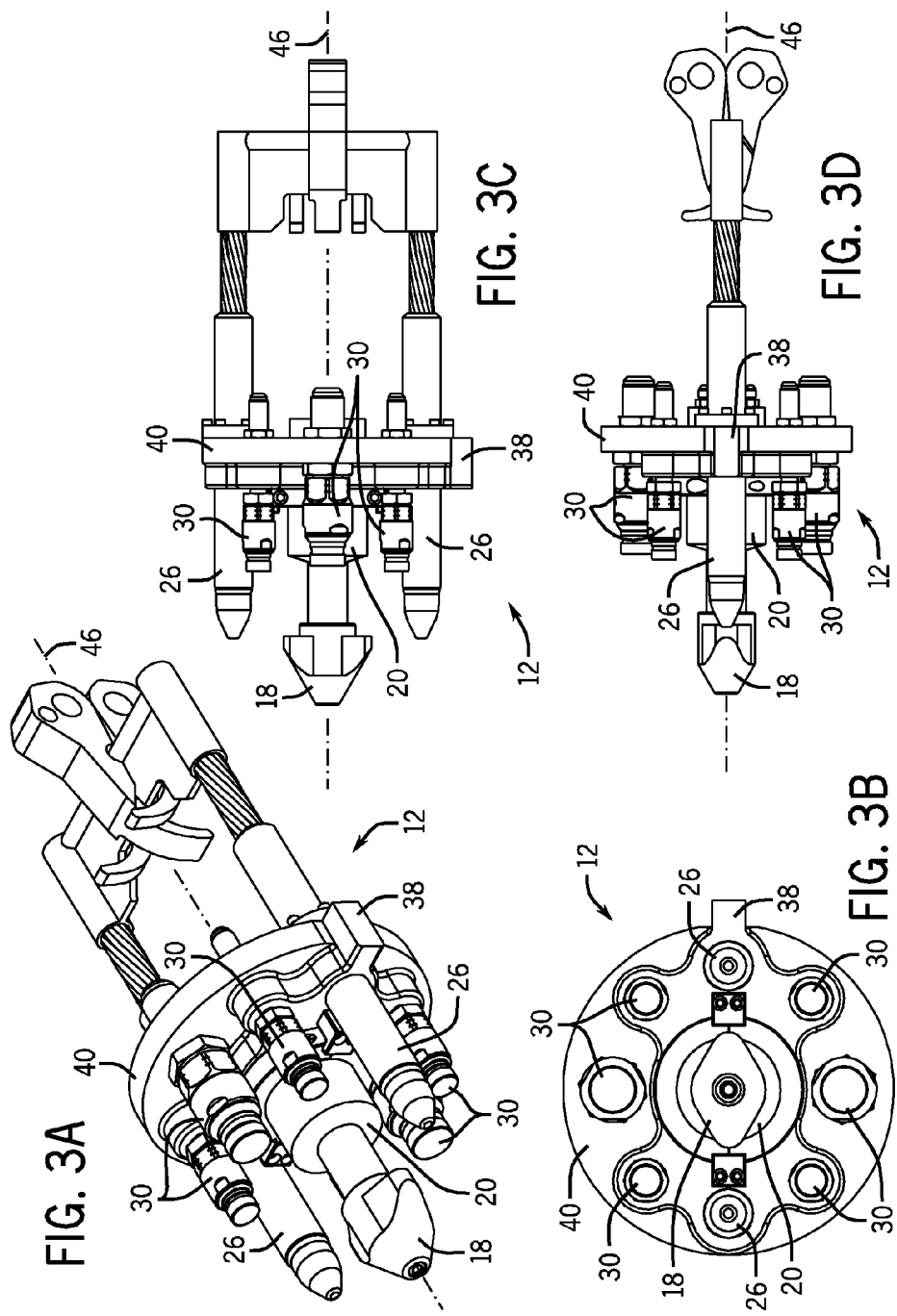

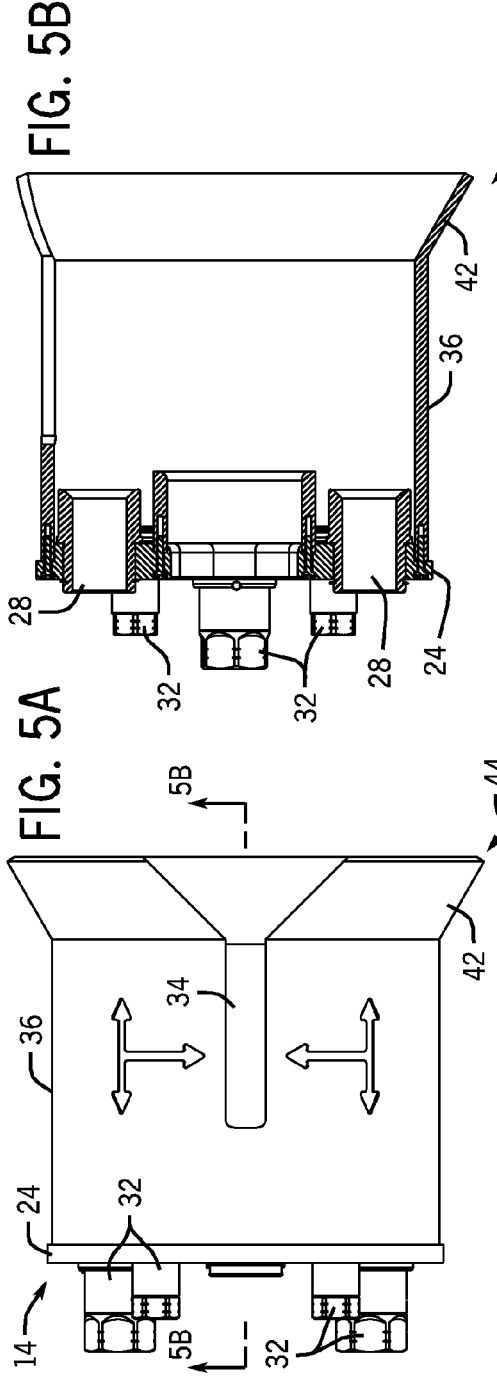
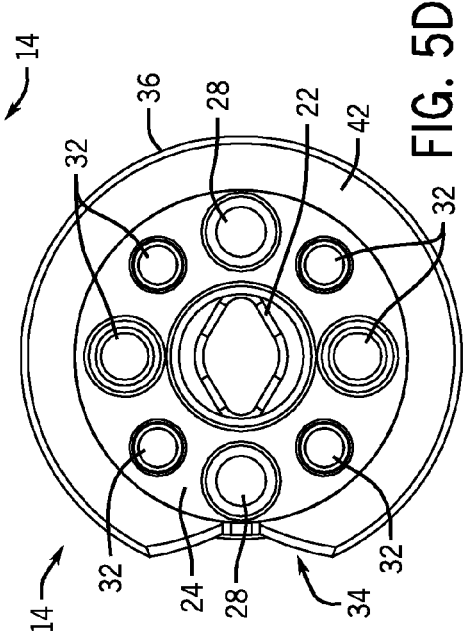
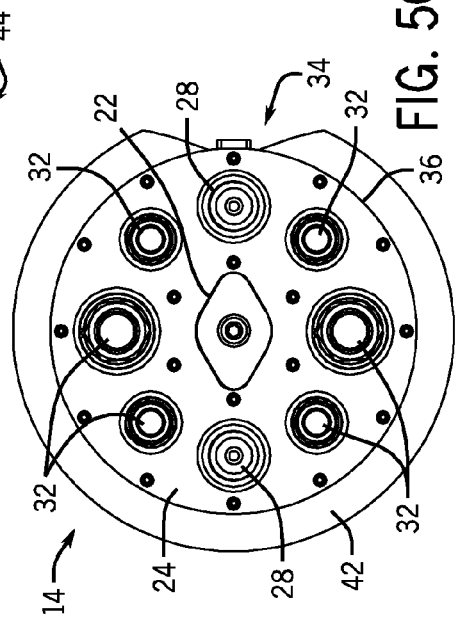
FIG. 5A
FIG. 5B
FIG. 5C
FIG. 5D

SUB-SEA MULTIPLE QUICK CONNECTOR ASSEMBLY

CROSS-REFERENCE TO RELATED APPLICATIONS

This application is a Non-Provisional Patent Application of U.S. Provisional Patent Application No. 61/717,493, entitled "Sub-Sea Multiple Quick Connector Assembly", filed on Oct. 23, 2012, which is herein incorporated by reference in its entirety for all purposes.

BACKGROUND

The present invention relates generally to sub-sea connector assemblies and, more specifically, to sub-sea multiple quick connector (MQC) assemblies.

Sub-sea components, such as remotely operated vehicles (ROVs), often need to be connected to other sub-sea components to, for example, couple hydraulic conduits, electrical connections, and so forth, between the sub-sea components. Conventional connector assemblies for connecting sub-sea components are often relatively complex and/or involve many moving parts. As such, there is a need for relatively simple and reliable connector assemblies for connecting sub-sea components.

BRIEF DESCRIPTION

In an embodiment, a multiple quick connector (MQC) assembly includes a male sub-assembly that includes a plurality of quick connectors coupled to a first circular plate, and an actuator coupled to the first circular plate. The actuator is configured to actuate a shaft having a draw nut attached to an axial end of the shaft. The MQC assembly also includes a female sub-assembly that includes a plurality of couplers coupled to a second circular plate. Each of the couplers is configured to couple to a respective quick connector of the male sub-assembly. The second circular plate comprises an aperture disposed therethrough. Actuation of the shaft causes the draw nut to rotate with respect to the aperture, and then to axially retract against the second circular plate to lock the male sub-assembly axially with respect to the female sub-assembly.

In another embodiment, a multiple quick connector (MQC) assembly includes a male sub-assembly that includes a plurality of quick connectors coupled to a first circular plate, an actuator coupled to the first circular plate, and a guide pin coupled to the first circular plate. The MQC assembly also includes a female sub-assembly that includes a plurality of couplers coupled to a second circular plate and a bushing coupled to the second circular plate. Each of the couplers is configured to couple to a respective quick connector of the male sub-assembly. The guide pin is axially inserted into the bushing when the male and female sub-assemblies are axially, radially, and rotationally aligned with each other.

In another embodiment, a method includes aligning male and female sub-assemblies of a multiple quick connector assembly such that a draw nut of the male sub-assembly is axially inserted through an aperture of a plate of the female sub-assembly. The method also includes rotating the draw nut with respect to the aperture. The method further includes axially retracting the draw nut against the plate to lock the male sub-assembly in place with respect to the female sub-assembly.

DRAWINGS

These and other features, aspects, and advantages of the present disclosure will become better understood when the following detailed description is read with reference to the accompanying drawings in which like characters represent like parts throughout the drawings, wherein:

FIG. 3A is perspective view of the male sub-assembly of the MQC assembly of FIG. 1;

FIG. 3B is front view of the male sub-assembly of the MQC assembly of FIG. 1;

FIG. 3C is top view of the male sub-assembly of the MQC assembly of FIG. 1;

FIG. 3D is side view of the male sub-assembly of the MQC assembly of FIG. 1;

FIG. 5A is a side view of the female sub-assembly of the MQC assembly of FIG. 1;

FIG. 5B is a cross-sectional top view of the female sub-assembly of the MQC assembly of FIG. 1;

FIG. 5C is a front view of the female sub-assembly of the MQC assembly of FIG. 1;

FIG. 5D is a back view of the female sub-assembly of the MQC assembly of FIG. 1;

DETAILED DESCRIPTION

Figure 1:
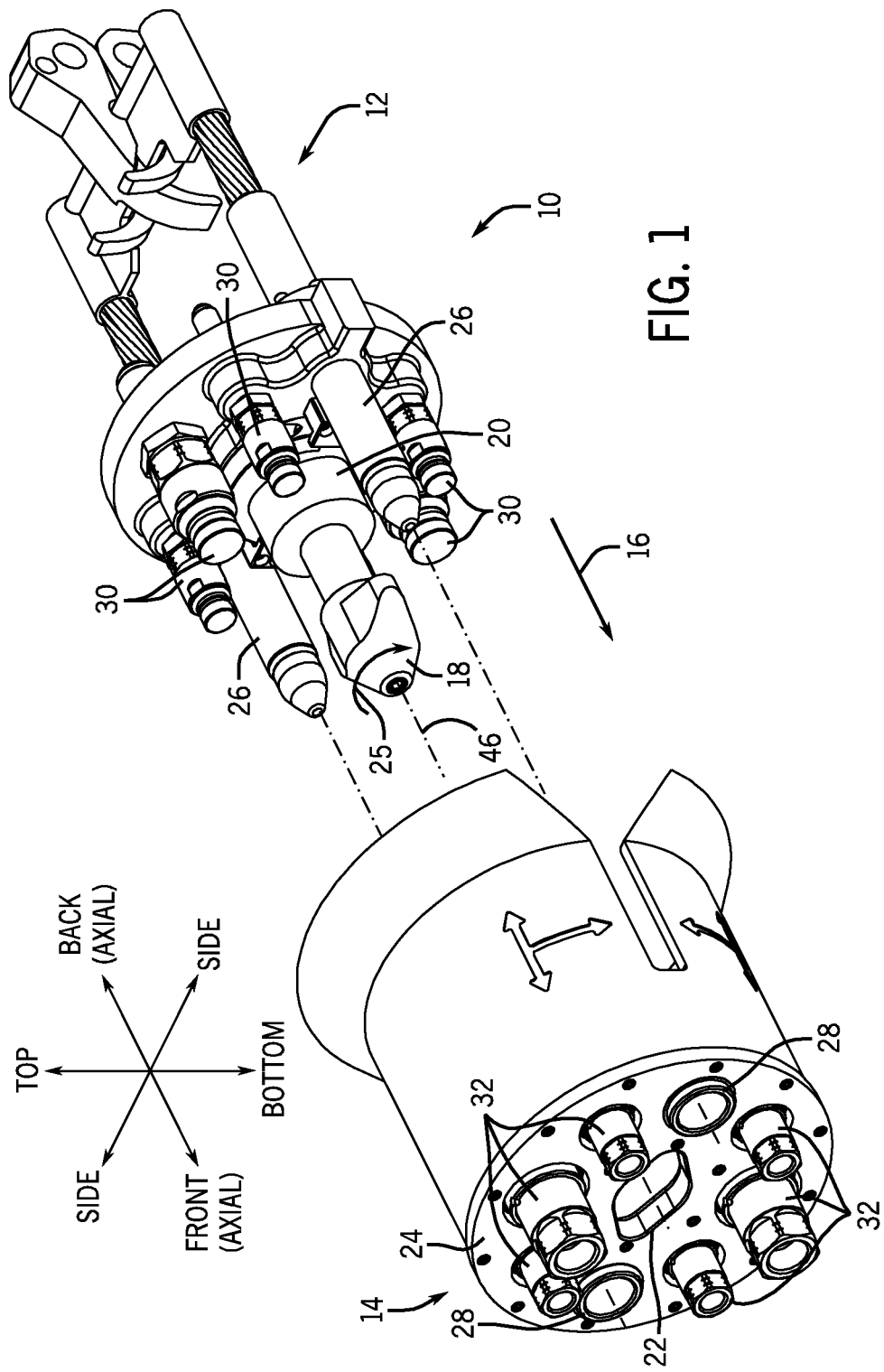
FIG. 1 is a perspective view of a sub-sea multiple quick connector (MQC) assembly in accordance with the present disclosure.

Turning now to the figures, FIG. 1 is a perspective view of a sub-sea multiple quick connector (MQC) assembly 10 in accordance with the present disclosure. As illustrated in FIG. 1, the MQC assembly 10 includes a male sub-assembly 12 and a female sub-assembly 14. The male sub-assembly 12 of the MQC assembly 10 is configured to connect to the female sub-assembly 14 of the MQC assembly 10, as described in greater detail below. In particular, while the male sub-assembly 12 is positioned within (e.g., axially, radially, and rotationally aligned with) the female sub-assembly 14 by moving the male sub-assembly 12 toward the female sub-assembly 14, as illustrated by arrow 16, a draw nut 18 of the male sub-assembly 12 is axially inserted into a mating aperture 22 through a circular plate 24 of the female sub-assembly 14. Once the male sub-assembly 12 is positioned within the female sub-assembly 14, the draw nut 18 is rotated by an actuator 20, as indicated by arrow 25. In addition, once the draw nut 18 is rotated, the actuator 20 axial retracts the draw nut 18 toward the male sub-assembly 12, thereby locking the draw nut 18 (and, hence, the male sub-assembly 12) in place with respect to the female sub-assembly 14. For example, in certain embodiments, the actuator 20 is a double acting actuator that first rotates the draw nut 18 axially and then axial retracts the draw nut 18.

Figure 8A:
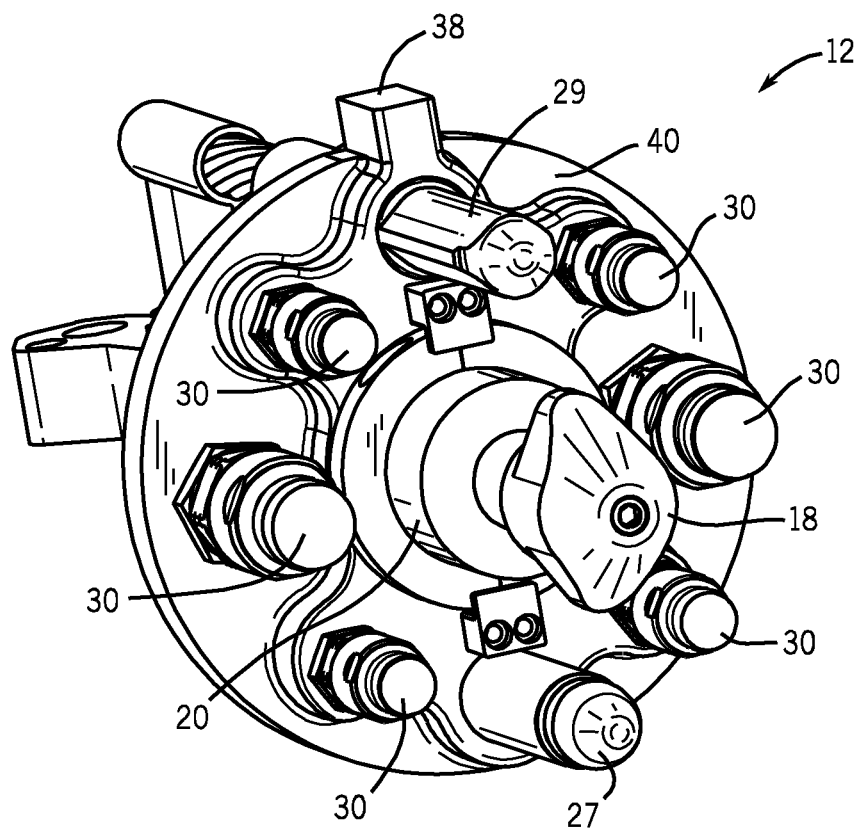
FIG. 8A is perspective view of an embodiment of the male sub-assembly having a first, circular guide pin and a second, diamond-shaped guide pin.
Figure 8B:
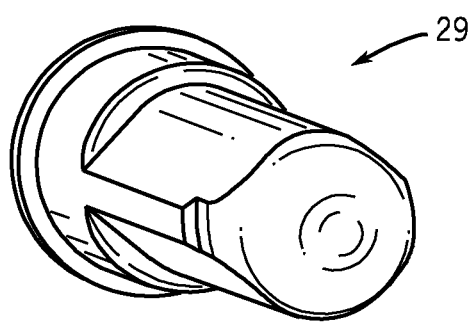
FIG. 8B is a perspective view of the diamond-shaped guide pin of FIG. 8A.

As also illustrated in FIG. 1, the MQC assembly 10 includes other features that couple the male and female sub-assemblies 12, 14 of the MQC assembly 10. For example, the male sub-assembly 12 includes guide pins 26 that are configured to be inserted into mating bushings 28 of the female sub-assembly 14. Although illustrated in FIG. 1 as including two guide pins 26, in other embodiments, the male sub-assembly 12 may include any number of guide pins 26, such as one, three, four, or even more guide pins 26. In addition, in certain embodiments, the guide pins 26 may have different shapes. For example, FIGS. 8A and 8B illustrate an embodiment of the male sub-assembly 12 having a first guide pin 27 having a circular cross-sectional area, and a second guide pin 29 having a diamond-shaped cross-sectional area. It will be appreciated that the first and second guide pins 27, 29 are associated with bushings 28 of the female sub-assembly 14. The second guide pin 29 helps alleviate tolerance buildup and possible racking of the guide pins 27, 29 during assembly. The first guide pin 27 provides primary alignment of four degrees of freedom (i.e., pitch, yaw, X, and Y) while the second guide pin 29 provides secondary alignment for securing the fifth degree of freedom of azimuth. Bottoming out (i.e., axially retracting) the actuator 20 secures the tertiary or last degree of freedom.

Returning now to FIG. 1, the male sub-assembly 12 also includes a plurality of quick connectors 30 that are configured to couple with couplers 32 of the female sub-assembly 14. In general, the quick connectors 30 and mating couplers 32 enable conduits (e.g., fluid hoses and so forth) to be connected between sub-sea components that are associated with the male and female sub-assemblies 12, 14 of the MQC assembly 10. The quick connectors 30 and associated couplers 32 are configured to quickly connect with each other when brought into alignment with each other, remain connected to each other during normal operation (e.g., when experiencing typical sub-sea forces), and quickly disconnect from each other when a certain amount of deliberate disconnecting force is exerted via the male sub-assembly 12 and/or the female sub-assembly 14. Although illustrated in FIG. 1 as including six quick connectors 30, in other embodiments, the male sub-assembly 12 may include any number quick connectors 30, such as one, two, three, four, five, seven, eight, or more quick connectors 30. In addition, as illustrated, it is noted that certain quick connectors 30 (and associated couplers 32) may be larger than others.

The type of connections that are facilitated between the quick connectors 30 and their associated couplers 32 may include a wide variety of connections. For example, as described above, these connections may include hydraulic connections. However, in certain embodiments, the quick connectors 30 and associated couplers 32 may also include, for example, wet mateable fiber optic connectors for enabling fiber optic connections between the male and female sub-assemblies 12, 14, wet mateable electrical connectors for facilitating electrical connections between the male and female sub-assemblies 12, 14, or any other type connections that facilitate establishment of energy- and/or telemetry-related conduits, which may be used to power equipment, as well as monitor, control, and provide video of operations.

Figure 2A:
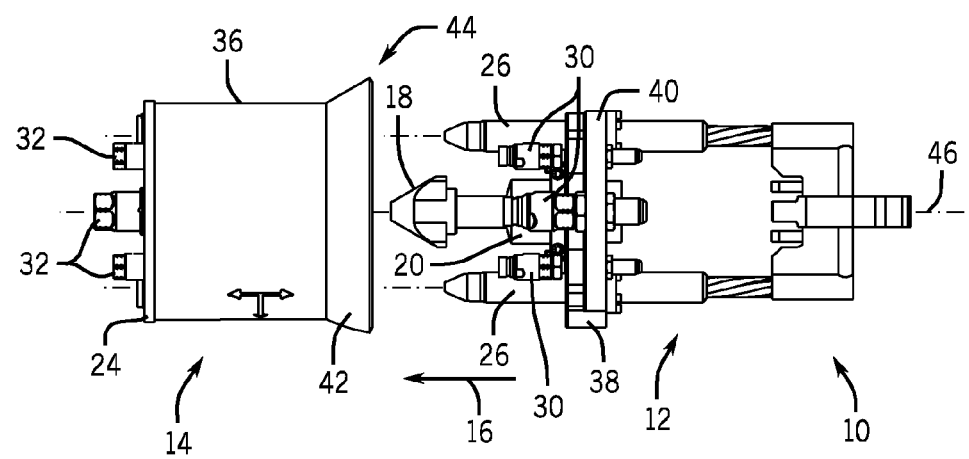
FIG. 2A is a top view of the male and female sub-assemblies of the MQC assembly of FIG. 1.
Figure 2B:
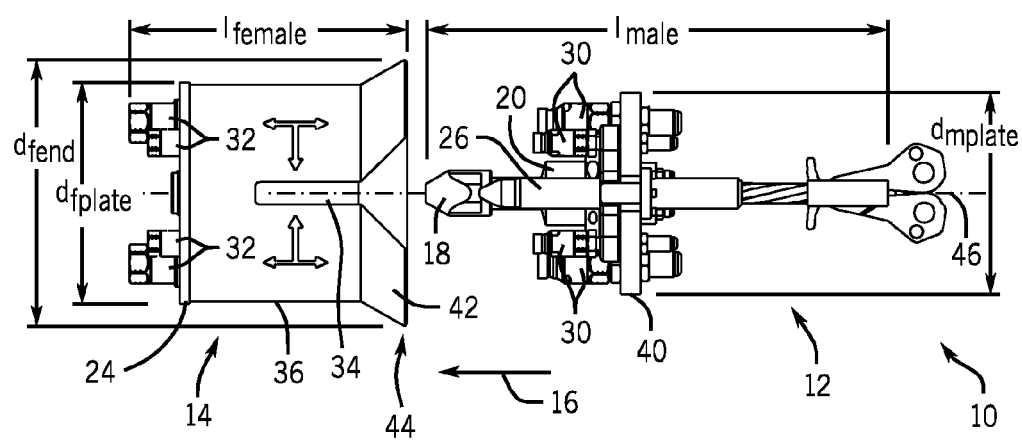
FIG. 2B is a side view of the male and female sub-assemblies of the MQC assembly of FIG. 1.

FIGS. 2A and 2B are top and side views, respectively, of the male and female sub-assemblies 12, 14 of the MQC assembly of FIG. 1 before insertion of the male sub-assembly 12 into the female sub-assembly 14. As illustrated, the female sub-assembly 14 includes an axially extending alignment slot 34 in an annular wall 36 of the female sub-assembly 14. The alignment slot 34 is configured to mate with an alignment guide 38 that extends radially from a circular plate 40 of the male sub-assembly 12. More specifically, the alignment guide 38 is a protrusion that extends radially from the plate 40 and has a geometry (e.g., rectangular) similar to the geometry of the alignment slot 34 in the wall 36 of the female sub-assembly 14. The alignment slot 34 and alignment guide 38 ensure that the components (e.g., the draw nut 18, the guide pins 26, the quick connectors 30, and so forth) of the male sub-assembly 12 properly align with the components (e.g., the aperture 22, the bushings 28, the couplers 32, and so forth) of the female sub-assembly 14 while the male sub-assembly 12 is being axially positioned within the female sub-assembly 14, as indicated by arrow 16.

In addition, the wall 36 of the female sub-assembly 14 also includes an end section 42 that gradually increases in diameter to an axial end 44 of the wall 36. In certain embodiments, the diameter increases at a substantially constant rate. As will be appreciated, the end section 42 aids in alignment of the male sub-assembly 12 within the female sub-assembly 14. More specifically, the end section 42 ensures that the components (e.g., the draw nut 18, the guide pins 26, the quick connectors 30, and so forth) of the male sub-assembly 12 are radially and rotationally aligned with the mating components (e.g., the aperture 22, the bushings 28, the couplers 32, and so forth) of the female sub-assembly 14 while the male sub-assembly 12 is being axially positioned within the female sub-assembly 14, as indicated by arrow 16.

FIG. 2B also illustrates some of the relative dimensions of the male and female sub-assemblies 12, 14. For example, the plate 24 of the female sub-assembly 14 has a diameter $d_{fplate}$ that, in certain embodiments, is in a range of approximately 10.0-12.5 inches and, more specifically, may be approximately 11.0 inches. As illustrated, the wall 36 of the female sub-assembly 14 has a diameter substantially similar to the diameter $d_{fplate}$ of the plate 24, which the wall 36 abuts, for a majority of the axial length of the wall 36. However, the end section 42 of the wall 36 gradually increases to a maximum diameter $d_{fend}$ that, in certain embodiments, is in a range of approximately 12.0-15.0 inches and, more specifically, may be approximately 13.25 inches. The plate 40 of the male sub-assembly 12 has a diameter $d_{mplate}$ that, in certain embodiments, is in a range of approximately 9.0-11.5 inches and, more specifically, may be approximately 10.0 inches. In addition, the female sub-assembly 14 has a length $l_{female}$ that, in certain embodiments, is in a range of approximately 10.0-17.5 inches and, more specifically, may be approximately 13.75 inches, and the male sub-assembly 12 has a length $l_{male}$ that, in certain embodiments, is in a range of approximately 20.0-26.0 inches and, more specifically, may be approximately 23.0 inches.

Figure 4:
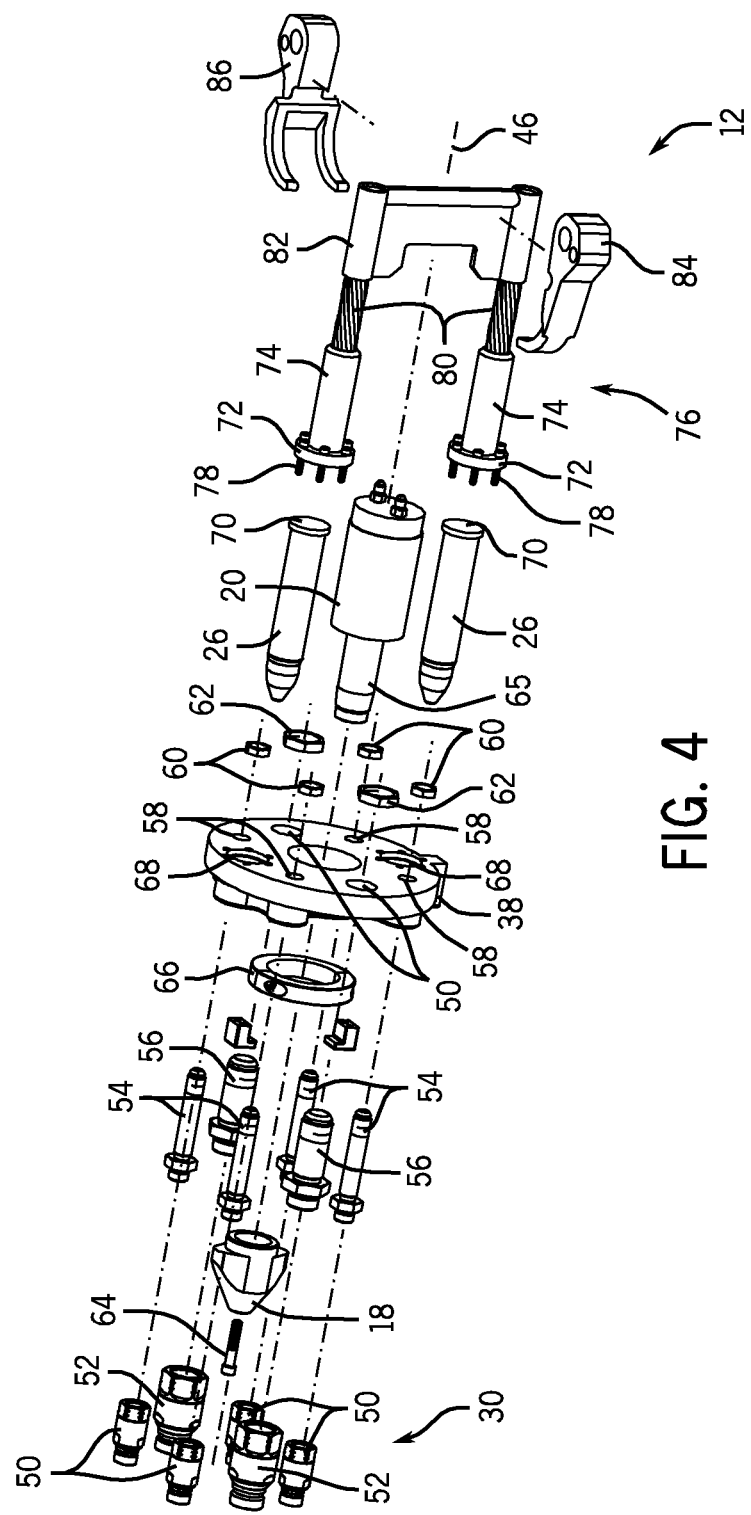
FIG. 4 is an exploded top view of the male sub-assembly of the MQC assembly of FIG. 1.
Figure 6:
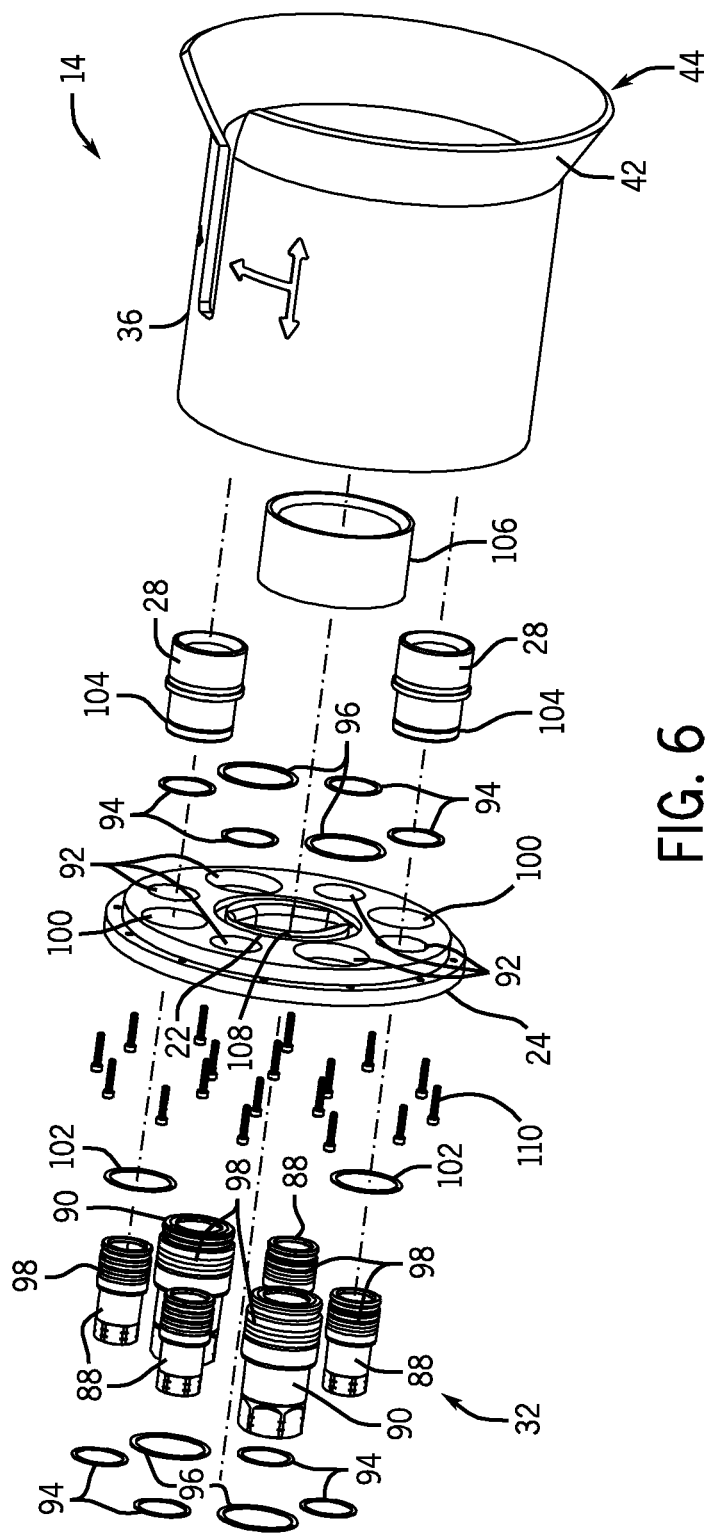
FIG. 6 is an exploded bottom view of the female sub-assembly of the MQC assembly of FIG. 1.

FIGS. 3 and 4 illustrate features of the male sub-assembly 12 of the MQC assembly 10 of FIG. 1, and FIGS. 5 and 6 illustrate features of the female sub-assembly 14 of the MQC assembly 10 of FIG. 1. For example, as illustrated in FIG. 3B, the guide pins 26 and the quick connectors 30 are arranged about the plate 40 of the male sub-assembly 12 in a generally equally spaced manner (e.g., in an annular configuration) near the radial periphery of the plate 40. However, in other embodiments, the guide pins 26 and the quick connectors 30 may be arranged about the plate 40 in other configurations. In addition, the draw nut 18 is disposed along a central axis 46 of the MQC assembly 10.

In addition, as illustrated in FIG. 5C, the aperture 22 through the plate 24 of the female sub-assembly 14 is generally shaped like a rhombus, and the draw nut 18 of the male sub-assembly 12 is similarly rhombus-shaped, enabling insertion of the draw nut 18 through the aperture 22 when the male and female sub-assemblies 12, 14 are properly aligned. Then, once inserted through the aperture 22, the draw nut 18 is rotated approximately 90 degrees and axially retracted by the actuator 20 such that the rhomboidal shapes of the aperture 22 and the draw nut 18 are offset and an axial force from the actuator 20 is applied from the draw nut 18 against the plate 24 of the female sub-assembly 14, thereby holding the draw nut 18 (and, hence, the male sub-assembly 12) axially in place with respect to the female sub-assembly 14.

FIG. 4 is an exploded top view of the male sub-assembly 12 of the MQC assembly 10 of FIG. 1, generally depicting how the components of the male sub-assembly 12 are assembled together. As described above, in certain embodiments, the male sub-assembly 12 includes quick connectors 30 of varying size. As illustrated, the quick connectors 30 may include four smaller quick connectors 50 and two larger quick connectors 52. For example, the smaller quick connectors 50 may be approximately 0.5 inch in diameter, and the larger quick connectors 52 may be approximately 1.0 inch in diameter. Each of the quick connectors 50, 52 is associated with similarly sized adjusters 54, 56 that couple to their respective quick connectors 50, 52 and are axially inserted through appropriately sized holes 58 through the plate 40, and are secured to the plate 40 via appropriately sized lock nuts 60, 62.

In addition, a socket head cap screw 64 is axially inserted through a central bore through the draw nut 18 and is screwed into a shaft 65 coupled to the actuator 20, thereby coupling the draw nut 18 to the actuator 20. Furthermore, a shaft collar 66 may be disposed around the actuator 20 on the same side of the plate 40 as the draw nut 18. In certain embodiments, the shaft collar 66 may be a two-piece large bore clamp-on shaft collar having an inner bore with an inner diameter of approximately 3.0 inches, an outer diameter of approximately 4.5 inches, and a width of approximately 0.75 inches.

As also illustrated, the guide pins 26 are axially inserted into appropriately sized holes 68 in the plate 40, and have slightly larger ends 70 that prevent the guide pins 26 from moving axially forward through the holes 68. Furthermore, the guide pins 26 are held against the plate 40 by a flange 72 of a base 74 of a compliant handle 76. As illustrated, the compliant handle 76 has two bases 74 that are used to attach the compliant handle 76 to the plate 40. Each of the flanges 72 of the compliant handle 76 are attached to the plate 40 by fastening mechanisms such as screws 78. Wire rope segments 80 attach the bases 74 of the compliant handle 76 to a main body portion 82 of the compliant handle 76. In certain embodiments, the wire rope segments 80 may be approximately 1.0 in diameter. The main body portion 82 of the compliant handle 76 is attached to an inner claw 84 and an outer claw 86, each of which are used to couple the male sub-assembly 12 (and, hence, the MQC assembly 10) to other sub-sea components, such as remotely operated vehicles (ROVs).

FIG. 6 is an exploded bottom view of the female sub-assembly 14 of the MQC assembly 10 of FIG. 1, generally depicting how the components of the female sub-assembly 14 are assembled together. As with the quick connectors 30 of the male sub-assembly 12, in certain embodiments, the female sub-assembly 14 includes couplers 32 of varying size. As illustrated, the couplers 32 may include four smaller couplers 88 and two larger couplers 90. For example, the smaller couplers 88 may be approximately 0.5 inch in diameter, and the larger couplers 90 may be approximately 1.0 inch in diameter. Each of the couplers 88, 90 are axially inserted into appropriately sized holes 92 through the plate 24, and are held in place by appropriately sized retaining rings 94, 96 on either side of the plate 24. More specifically, the retaining rings 94, 96 may be spiral retaining rings that mate with grooves 98 that extend circumferentially around the couplers 88, 90.

In addition, the bushings 28 are axially inserted into appropriately sized holes 100 through the plate 24, and are held in place by appropriately sized retaining rings 102 on an opposite side of the plate 24. More specifically, the retaining rings 102 may be spiral retaining rings that mate with grooves 104 that extend circumferentially around the bushings 28. As described above, the guide pins 26 of the male sub-assembly 12 are inserted into the bushings 28 to align the male sub-assembly 12 with the female sub-assembly 14. In addition, the female sub-assembly 14 includes a stop tube 106 that abuts the actuator 20 of the male sub-assembly 12 when the male and female sub-assemblies 12, 14 are brought into axial alignment with each other. In certain embodiments, the stop tube 106 may be interference fit into a mating circular groove 108 on a side of the plate 24. Once all of the components (e.g., the couplers 32, the bushings 28, the stop tube 106, and so forth) are attached to the plate 24, the plate 24 is secured to the annular wall 36 via a plurality of fastening mechanisms such as screws 110.

As described above, once the male and female sub-assemblies 12, 14 are axially, radially, and rotationally aligned with each other, the actuator 20 of the male sub-assembly 12 causes the draw nut 18 to rotate approximately 90 degrees with respect to the aperture 22 of the plate 24, and then causes the draw nut 18 to be axially retracted toward the actuator 20, thereby applying a force from the draw nut 18 against the plate 24 and locking the draw nut 18 (and, hence, the male sub-assembly 12) in place with respect to the plate 24 (and, hence, the female sub-assembly 14). For example, in certain embodiments, the actuator 20 may be a double acting actuator, such as the Roemheld Series 3 clockwise threaded double acting actuator.

Figure 7:
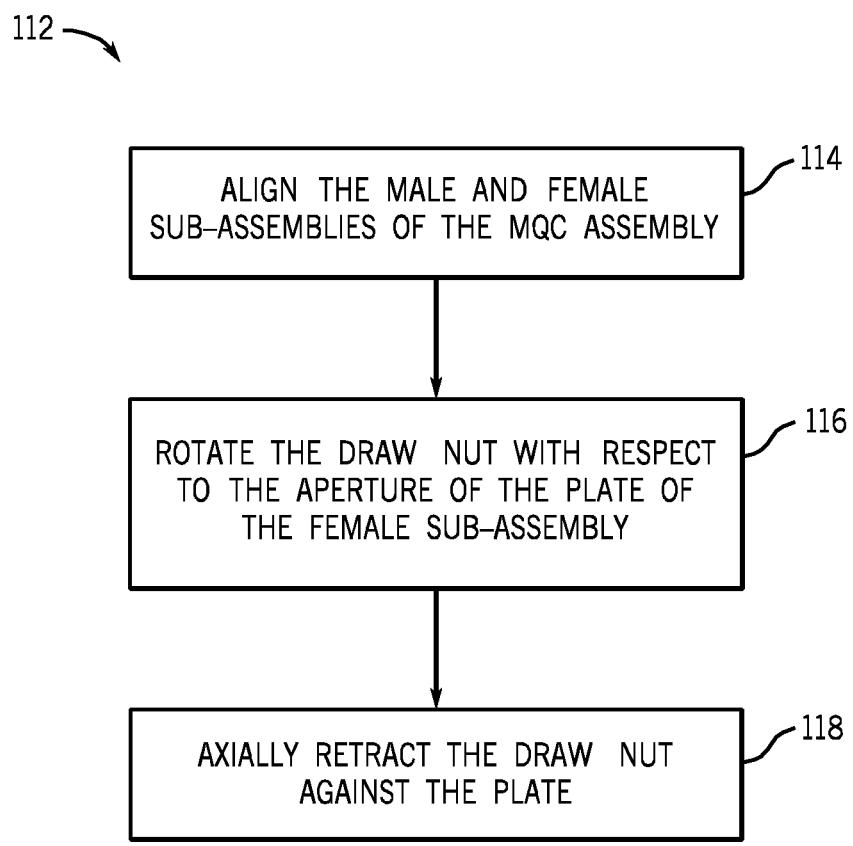
FIG. 7 is a flow chart of an exemplary method of use of the MQC assembly of FIG. 1.

FIG. 7 is a flow chart of an exemplary method 112 of use of the MQC assembly 10 of FIG. 1. In step 114, the male and female sub-assemblies 12, 14 of the MQC assembly 10 are aligned (e.g., axially, radially, and rotationally) with each other. In step 116, the draw nut 18 of the male sub-assembly 12 is rotated with respect to the aperture 22 through the plate 24 of the female sub-assembly 14. In step 118, the draw nut 18 is axially retracted by the actuator 20 to apply a force from the draw nut 18 against the plate 24 and lock the draw nut 18 (and, hence, the male sub-assembly 12) in place with respect to the plate 24 (and, hence, the female sub-assembly 14).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A multiple quick connector assembly, comprising:
   a male sub-assembly comprising a plurality of quick connectors coupled to a first circular plate, and an actuator coupled to the first circular plate, wherein the actuator is configured to actuate a shaft having a draw nut attached to an axial end of the shaft, wherein the male sub-assembly is coupled to a compliant handle comprising a wire rope segment and an inner and outer claw for coupling the compliant handle to an external sub-sea component; and a female sub-assembly comprising a plurality of couplers coupled to a second circular plate, wherein each of the couplers is configured to couple to a respective quick connector of the male sub-assembly, and wherein the second circular plate comprises an aperture disposed therethrough;

wherein actuation of the shaft causes the draw nut to rotate with respect to the aperture, and then to axially retract against the second circular plate to lock the male sub-assembly axially with respect to the female sub-assembly.

2. The multiple quick connector assembly of claim 1, wherein the male sub-assembly comprises a guide pin coupled to the first circular plate, the female sub-assembly comprises a bushing coupled to the second circular plate, and the guide pin is axially inserted into the bushing when the male and female sub-assemblies are axially, radially, and rotationally aligned with each other.

3. The multiple quick connector assembly of claim 1, wherein the male sub-assembly comprises first and second guide pins coupled to the first circular plate, wherein the first guide pin comprises a circular cross-sectional area and the second guide pin comprises a diamond-shaped cross-sectional area.

4. The multiple quick connector assembly of claim 1, wherein the male sub-assembly comprises an alignment guide extending radially from the first circular plate, the female sub-assembly comprises an annular wall having an alignment slot extending axially at an axial end of the annular wall, and the alignment guide is axially inserted into the alignment slot when the male and female sub-assemblies are axially, radially, and rotationally aligned with each other.

5. The multiple quick connector assembly of claim 4, wherein the annular wall comprises an end section having a diameter that increases toward the axial end of the annular wall.

6. The multiple quick connector assembly of claim 1, wherein the draw nut and the aperture are both rhombus-shaped.

7. The multiple quick connector assembly of claim 1, wherein the plurality of quick connectors are disposed in an annular formation about the first circular plate.

8. The multiple quick connector assembly of claim 1, wherein the plurality of quick connectors comprise a plurality of smaller quick connectors and a plurality of larger quick connectors, the plurality of couplers comprise a plurality of smaller couplers and a plurality of larger couplers, each of the smaller couplers is configured to couple to a respective smaller quick connector, and each of the larger couplers is configured to couple to a respective larger quick connector.

9. The multiple quick connector assembly of claim 1, wherein at least one of the plurality of quick connectors and at least one of the plurality of couplers facilitate establishment of a hydraulic connection between the male and female sub-assemblies.

10. The multiple quick connector assembly of claim 1, wherein at least one of the plurality of quick connectors and at least one of the plurality of couplers facilitate establishment of a fiber optic connection between the male and female sub-assemblies.

11. The multiple quick connector assembly of claim 1, wherein at least one of the plurality of quick connectors and at least one of the plurality of couplers facilitate establishment of an electrical connection between the male and female sub-assemblies.

12. The multiple quick connector assembly of claim 1, wherein the external sub-sea component comprises a remotely operated vehicle.

13. A multiple quick connector assembly, comprising:
a male sub-assembly comprising a plurality of quick connectors coupled to a first circular plate, an actuator coupled to the first circular plate, and a guide pin coupled to the first circular plate, wherein the male sub-assembly is coupled to a compliant handle comprising a wire rope segment and an inner and outer claw for coupling the compliant handle to an external sub-sea component; and a female sub-assembly comprising a plurality of couplers coupled to a second circular plate and a bushing coupled to the second circular plate, wherein each of the couplers is configured to couple to a respective quick connector of the male sub-assembly;

wherein the guide pin is axially inserted into the bushing when the male and female sub-assemblies are axially, radially, and rotationally aligned with each other.

14. The multiple quick connector assembly of claim 13, wherein the actuator is configured to actuate a shaft having a draw nut attached to an axial end of the shaft, the second circular plate comprises an aperture disposed therethrough, and actuation of the shaft causes the draw nut to rotate with respect to the aperture, and then to axially retract against the second circular plate to lock the male sub-assembly axially with respect to the female sub-assembly.

15. The multiple quick connector assembly of claim 13, wherein the male sub-assembly comprises first and second guide pins coupled to the first circular plate, wherein the first guide pin comprises a circular cross-sectional area and the second guide pin comprises a diamond-shaped cross-sectional area.

16. The multiple quick connector assembly of claim 13, wherein the male sub-assembly comprises an alignment guide extending radially from the first circular plate, the female sub-assembly comprises an annular wall having an alignment slot extending axially at an axial end of the annular wall, and the alignment guide is axially inserted into the alignment slot when the male and female sub-assemblies are axially, radially, and rotationally aligned with each other.

17. The multiple quick connector assembly of claim 16, wherein the annular wall comprises an end section having a diameter that increases toward the axial end of the annular wall.

18. The multiple quick connector assembly of claim 13, wherein the plurality of quick connectors comprise a plurality of smaller quick connectors and a plurality of larger quick connectors, the plurality of couplers comprise a plurality of smaller couplers and a plurality of larger couplers, each of the smaller couplers is configured to couple to a respective smaller quick connector, and each of the larger couplers is configured to couple to a respective larger quick connector.

* * * * *